Patented July 3, 1951

2,559,177

UNITED STATES PATENT OFFICE 2,559,177

PLASTICIZED POLYVINYL RESIN COMPOSITIONS

David E. Terry and Donald H. Wheeler, Minneapolis, Minn., assignors to General Mills, Inc., a corporation of Delaware No Drawing. Application May 1, 1950, Serial No. 159,378

9 Claims. (Cl. 260—30.4)

The present invention relates to plasticized polyvinyl resin compositions and is a continuation-in-part of our copending application Serial No. 683,164, filed July 12, 1946, entitled Polyvinyl Ester Resins Plasticized with Esters of Epoxy Fatty Acids.

Polyvinyl resins are generally too hard and rigid to be used for many purposes without a plasticizer. It is usually necessary to add a plasticizer to make the resin soft and pliable and capable of being milled into strong pliable sheets or films. It is also necessary that the plasticized resin composition have excellent heat stability, suppleness, and elasticity. In order for a material to act as a plasticizer, it is necessary that it be compatible with the resin and not exude or sweat out to leave the resin unplasticized.

There have been found relatively few plasticizers which are really satisfactory for plasticizing vinyl resins. The esters of dibasic acids, such as phthalic acid, sebacic acid, have been most widely used for plasticizing such resins. However, unless the esters are derived from alcohols of fairly high molecular weight, such as octyl alcohol, the plasticizers are of too low a molecular weight and therefore too volatile for many uses. Plasticizers which are sufficiently non-volatile and which also have the ability to give flexibility at low temperature and have some measure of stability against heat discoloration are quite few in number. Furthermore, as will be pointed out hereinafter, the stability of such compounds is generally not particularly satisfactory.

It has been found that high molecular weight esters of long chain fatty acids containing an epoxy group are excellent plasticizers for polyvinyl resins. These epoxy esters are easily prepared, relatively inexpensive, and confer excellent heat stability, low temperature flexibility, suppleness, and elasticity to vinyl resins containing them as plasticizers.

It is therefore an object of the present invention to provide plasticized polyvinyl resin compositions containing high molecular weight esters of long chain fatty acids containing an epoxy group.

In general the invention comprises a polyvinyl resin plasticized with a high molecular weight ester containing a higher fatty acid group having an epoxy group. The invention is applicable to polyvinyl resins in general, and particularly polyvinyl chloride, polyvinyl acetate, vinyl chloride-vinyl acetate copolymers, vinyl chloride-vinylidene chloride copolymers, and polyvinyl butyral.

The plasticizing agents employed may be of a wide variety. They include the aliphatic and cycloaliphatic, aryl and aralkyl esters of an epoxy fatty acid, the fatty acid group containing from 8 to 22 carbon atoms. The fatty acid group may be derived from any animal, vegetable, or marine oil containing unsaturated fatty acid groups; they may be derived from the mixed fatty acids contained in such oils; or may be derived from isolated unsaturated fatty acids. A wide variety of alcohol groups may be used for esterification of the epoxy fatty acid. These alcohols include those having a hydrocarbon group attached to the hydroxyl group and include particularly monohydric aliphatic alcohols such as methyl, ethyl, propyl, butyl alcohols, and the like; polyhydric alcohols such as the glycols, diethylene glycol, and the like; glycerols and polyglycerols, etc. The alcohols used for esterification also include the aromatic alcohols such as phenol; the aralkyl alcohols such as benzyl alcohol; and cycloaliphatic alcohols such as cyclohexanol.

While suitable plasticizing properties are obtained when the epoxy ester contains some quantities of esters free of epoxy groups, it is preferred to employ pure epoxy esters or mixtures in which most of the esters present have one or more epoxy groups in each molecule. Particularly desirable are compositions containing 2–6% epoxy oxygen.

The amount of plasticizer employed can be varied quite widely, depending on the properties of the particular resin composition desired. As little as 5% and as much as 40–50% or more may be used. The examples given hereinafter are mostly at a single level of plasticization in order that direct comparisons may be made. The epoxy compounds described may be used in admixture with plasticizers deficient in plasticizing action, low temperature flexibility and heat stability, to confer these properties to the resulting resin to a degree depending upon the amount of epoxy compound added.

In the examples various vinyl polymers were mixed with the plasticizers indicated, usually by milling for a short time on steam heated rolls, sheeted and molded with heat and pressure to afford suitable test sheets. In some cases, the resin and plasticizer were dissolved in a suitable solvent and a film of the plasticized resin was formed by evaporation of solvent. The tests used for compatibility (sweat out or exudation of plasticizer), for heat stability and for minimum flex temperature were those described by M. C. Reed in Ind. Eng. Chem. 35 896 (1943). The test for elongation at 1000 pounds per square inch was made on a suitably shaped strip in a Scott tester which applied the 1000 pounds per square inch to the sample in 55 seconds. The amount of elongation is given as a direct measure of the plasticizer efficiency for comparative purposes at a definite plasticizer level. The greater the elongation, the more efficient the plasticizer at room temperature at which this test was made.

*Example 1*

This and the following example are given for the purpose of comparison with the epoxy plasticizers described herein. The plasticizers set forth in these first two examples are currently widely used on polyvinyl chloride-acetate.

Sixty-three and one-half parts of a polyvinyl chloride-acetate (Carbide and Carbon Chemicals Corp.'s "Vinylite VYNW"), 1.0 part of basic lead carbonate, 0.5 part of stearic acid, and 35.0 parts of tricresyl phosphate were milled, sheeted and molded. The resulting resin showed:

Sweat-out _____ None
Heat stability _____ 1.5 hrs.
Min. Flex. Temp. _____ —0° C.
Percent Elong. 1000#/in.$^2$ _____ 90%

*Example 2*

The same procedure was followed as in No. 1 except that di(2-ethyl hexyl) phthalate was substituted for the tricresyl phosphate. The resulting resin showed:

Sweat-out _____ None
Heat stability _____ 4 hours
Min. Flex. Temp. _____ —21° C.
Percent Elong. 1000#/in.$^2$ _____ 87%

*Example 3*

The same procedure was followed as in No. 1 except that methyl epoxystearate (epoxidized methyl oleate) was used as the plasticizer. The resulting resin showed:

Sweat-out _____ None
Heat stability _____ 8 hours
Min. Flex. Temp. _____ —41° C.
Percent Elong. 1000#/in.$^2$ _____ 172%

*Example 4*

The same procedure was followed as in No. 1 except that epoxidized methyl esters of soybean oil acids were used. The resulting resin showed:

Sweat-out _____ None
Heat stability _____ 8 hours
Min. Flex. Temp. _____ —32° C.
Percent Elong. 1000#/in.$^2$ _____ 159%

*Example 5*

Same procedure as No. 1 except that epoxidized "monomer" was used. ("Monomer" is used to designate the unpolymerized methyl esters of soybean oil acids. When methyl esters of soybean oil acids are heat polymerized, the unpolymerized "monomer" portion (mostly methyl oleate, with some methyl palmitate, methyl stearate and unpolymerized methyl linoleate) can be distilled off under vacuum, leaving the "dimer" containing di- and higher polymeric fatty acid esters as an undistilled residue). The resulting resin showed:

Sweat-out _____ None
Heat stability _____ 8 hours
Min. Flex. Temp. _____ —32° C.
Percent Elong. 1000#/in.$^2$ _____ 148%

*Example 6*

Same procedure as No. 1, except that the epoxidized "dimer" from Example 5 was used. The resulting resin showed:

Sweat-out _____ None
Heat stability _____ 7 hours
Min. Flex. Temp. _____ —9° C.
Percent Elong. 1000#/in.$^2$ _____ 58%

*Example 7*

Same as No. 1 except that diethylene glycol diepoxy-stearate (epoxidized diethylene glycol dioleate) was used. The resulting resin showed:

Sweat-out _____ None
Heat stability _____ More than 8 hours
Min. Flex. Temp. _____ —32° C.
Percent Elong. 1000#/in.$^2$ _____ 75%

*Example 8*

Same as No. 1 except that epoxidized monomer was used, and polyvinyl chloride (B. F. Goodrich Co.'s "Geon" resin 101) was used. The resulting resin showed:

Sweat-out _____ None
Heat stability _____ Greater than 8 hours
Min. Flex. Temp. _____ —31° C.
Percent Elong. 1000#/in.$^2$ _____ 115%

*Example 9*

Same as No. 8 except that di-(ethyl hexyl) phthalate was used. This test is for comparison with No. 8.

Sweat-out _____ None
Heat stability _____ 4.5 hours
Min. Flex. Temp. _____ —26° C.
Percent Elong. 1000#/in.$^2$ _____ 75%

*Example 10*

Same as No. 1 except that epoxidized monomer and vinyl chloride-vinylidene chloride copolymer (B. F. Goodrich Co.'s "Geon" resin 202) was used. The resulting resin showed:

Sweat-out _____ None
Heat stability _____ more than 8 hours
Min. Flex. Temp. _____ —40° C.
Percent Elong. 1000#/in.$^2$ _____ 206%

*Example 11*

Same as No. 10 except di-(2-ethyl hexyl) phthalate was used for comparison with No. 10.

Sweat-out _____ None
Heat stability _____ 4.5 hours
Min. Flex. Temp. _____ —23° C.
Percent Elong. 1000#/in.$^2$ _____ 125%

*Example 12*

Same as No. 1 except that epoxidized soybean oil was used:

Sweat-out _____ None
Heat stability _____ 8 hours
Min. Flex. Temp. _____ —10° C.
Percent Elong. 1000#/in.$^2$ _____ 75%

*Example 13*

Two parts of a vinyl chloride-vinyl acetate copolymer (Carbide & Carbon Co's Vinylite VYHH), 1 part of epoxidized monomer were dissolved in ethylene dichloride to make a 10% solution which was cast on glass plates. The dried film was clear, colorless, tough, strong and elastic, with no sweat-out.

*Example 14*

Two parts of polyvinyl butyral (Carbide and Carbon Co.'s "Vinylite" XYSG), 1 part of epoxidized monomer were dissolved in butanol to make a 10% solution which was cast on glass plates. The dried film was clear, colorless, tough, and elastic with no sweat-out.

*Example 15*

Two parts of a vinyl chloride-vinyl acetate copolymer (Carbide and Carbon Co.'s "Vinylite" XYLF), 1 part of epoxidized monomer, were dissolved in ethylene dichloride to make a 10% solution which was cast on glass plates. The dried film was clear, colorless, tough and elastic with no sweat-out.

*Example 16*

Three parts of butyl epoxystearate, 2 parts of tricresyl phosphate and 10 parts of polyvinyl acetate (Carbide and Carbon Co.'s "Vinylite" AYAF) were dissolved in ethylene dichloride to make a 10% solution which was cast on glass plates. The dried film was colorless, tough and elastic without any sweat-out.

*Example 17*

Polyvinyl chloride-acetate (Carbide and Carbon Co.'s "VYNW") was milled with butyl epoxystearate in a manner similar to No. 1 except that the % plasticizer was 4.5%, 12%, 35%, and 42% respectively in four different samples. The plasticizing effect of as little as 4.5% of epoxy compound was evident, and the samples became increasingly more flexible and elastic as the % of plasticizer was increased. There was no sweat-out in any case.

*Example 18*

Benzyl epoxystearate (iodine value 5.0, acid number 0.6 epoxy oxygen 3.6%) was used to plasticize polyvinyl chloride-acetate resin (Vinylite VYNW) at a level of 35% by weight of the plasticized resin. The plasticized resin had the following characteristics:

Stability at 160° C_____ >8 hours
Minimum flex temperature_____ −38° C.
Elongation at 1000#/sq. in_____ 119%
Loss in weight in 10 days at 60° C_____ 0.53%

*Example 19*

Cyclohexyl epoxystearate (iodine value 5.3, acid number 1.3, epoxy oxygen 3.7%) was used to plasticize polyvinyl chloride-acetate resin (Vinylite VYNW) at a level of 35% of the plasticized resin. The product had the following properties:

Stability at 160° C_____ 7-8 hours
Minimum flex temperature_____ −39° C.
Elongation at 1000#/sq. in_____ 96%
Loss in weight in 10 days at 60° C_____ 0.45%

*Example 20*

Phenyl epoxystearate (iodine number 1.77, epoxy oxygen 3.72%, saponification number 150, acid number .44) was milled into polyvinyl chloride-acetate (Vinylite VYNW) at a level of 35% of the plasticized resin. The plasticized product was soft and flexible and showed no indication of early sweat out.

Heat stability at 160° C_____ in excess of 9 hours
Minimum flex temperature_____ −26° C.
Elongation at 1000#/sq. in_____ 121%

It will be observed from the above examples that the present invention provides excellent plasticized vinyl resin compositions which are definitely superior to the compositions which are obtainable with the best plasticizers heretofore known in the art.

We claim as our invention:

1. A polyvinyl ester resin composition plasticized with an ester of a higher fatty acid containing from 8 to 22 carbon atoms, the higher fatty acid group containing an epoxy group, the alcohol group of the ester being selected from the group consisting of aliphatic alcohols, cycloaliphatic alcohols, aryl alcohols, and aralkyl alcohols.

2. A polyvinyl ester resin composition plasticized with an aliphatic ester of a higher fatty acid containing from 8 to 22 carbon atoms, the higher fatty acid group containing an epoxy group.

3. A polyvinyl ester resin composition plasticized with an ester of a higher fatty acid containing from 8 to 22 carbon atoms, the higher fatty acid group containing an epoxy group, the alcohol group of the ester being selected from the group consisting of aliphatic alcohols, cycloaliphatic alcohols, aryl alcohols, and aralkyl alcohols, said ester containing from 2% to 6% of epoxy oxygen.

4. A polyvinyl ester resin according to claim 1 in which the epoxidized fatty acid group is derived from the mixed fatty acids of a fat.

5. A polyvinyl ester resin composition plasticized with a butyl ester of a higher fatty acid containing from 8 to 22 carbon atoms, the higher fatty acid group containing an epoxy group.

6. A polyvinyl ester resin composition plasticized with butyl epoxy stearate.

7. A polyvinyl ester resin composition plasticized with cyclohexyl epoxy stearate.

8. A polyvinyl ester resin composition plasticized with benzyl epoxy stearate.

9. A polyvinyl ester resin composition plasticized with phenyl epoxy stearate.

DAVID E. TERRY.
DONALD H. WHEELER.

REFERENCES CITED

The following references are of record in the file of this patent:

UNITED STATES PATENTS

| Number | Name | Date |
|---|---|---|
| 2,400,333 | Bent | May 14, 1946 |

FOREIGN PATENTS

| Number | Country | Date |
|---|---|---|
| 477,843 | Great Britain | Jan. 3, 1938 |